(12) United States Patent
Chene et al.

(10) Patent No.: US 9,085,224 B2
(45) Date of Patent: Jul. 21, 2015

(54) MOTOR VEHICLE HAVING THREE MOTORS, I.E. AN ELECTRIC MOTOR, A HYDRAULIC MOTOR AND A HEAT ENGINE, AND METHOD FOR MANAGING THE ENERGY STORED ONBOARD

(75) Inventors: Richard Chene, Neuilly (FR); Dominique Delamour, Les Mesnuls (FR); Alain Miklitarian, Paris (FR); Olivier Rodi, Gambais (FR)

(73) Assignee: SAFRA, Albi (FR)

( * ) Notice: Subject to any disclaimer, the term of this patent is extended or adjusted under 35 U.S.C. 154(b) by 30 days.

(21) Appl. No.: 14/000,473

(22) PCT Filed: Feb. 17, 2012

(86) PCT No.: PCT/EP2012/052817
§ 371 (c)(1),
(2), (4) Date: Sep. 24, 2013

(87) PCT Pub. No.: WO2012/113736
PCT Pub. Date: Aug. 30, 2012

(65) Prior Publication Data
US 2014/0014431 A1    Jan. 16, 2014

(30) Foreign Application Priority Data
Feb. 22, 2011    (FR) ...................................... 11 00528

(51) Int. Cl.
*B60K 6/00*    (2006.01)
*B60K 6/12*    (2006.01)
*B60K 6/48*    (2007.10)

(52) U.S. Cl.
CPC ... *B60K 6/12* (2013.01); *B60K 6/00* (2013.01); *B60K 6/48* (2013.01); *B60K 2006/4808* (2013.01); *Y02T 10/626* (2013.01);
(Continued)

(58) Field of Classification Search
CPC .............. B60K 8/00; B60K 6/08; B60K 6/42; B60K 6/12; B60T 1/10; Y02T 10/6208
USPC ............. 180/305, 69.3, 165, 301, 307, 65.21, 180/65.225, 65.265, 65.275, 65.28, 65.285; 477/2, 203; 318/45
See application file for complete search history.

(56) References Cited

U.S. PATENT DOCUMENTS 3,923,115 A * 12/1975 Helling ........................ 180/65.25
5,024,633 A *  6/1991 Schmidt ........................... 475/72
(Continued)

FOREIGN PATENT DOCUMENTS

WO    2008072044    6/2008

*Primary Examiner* — Brodie Follman
(74) *Attorney, Agent, or Firm* — Duane Morris LLP; J. Rodman Steele, Jr.; Gregory M. Lefkowitz

(57) ABSTRACT

The invention relates to a motor vehicle having three motors, i.e. an electric motor, hydraulic motor, and heat engine, and to a method for managing the energy stored onboard. The three motors (19, 25, 15) are particularly used for driving the vehicle, and are associated with means for storing electrical energy (21), hydraulic energy (28, 29), and fossil energy (18), respectively. The heat engine (15) is arranged so as to be connected in series and so as to recharge the means (28, 29) for storing hydraulic energy, but not the means (21) for storing electrical energy. During travel, the means (21) for storing electrical energy is not recharged by the heat engine (15) which can recharge the means (28, 29) for storing hydraulic energy of the hydraulic motor.

9 Claims, 3 Drawing Sheets

Figure 1:
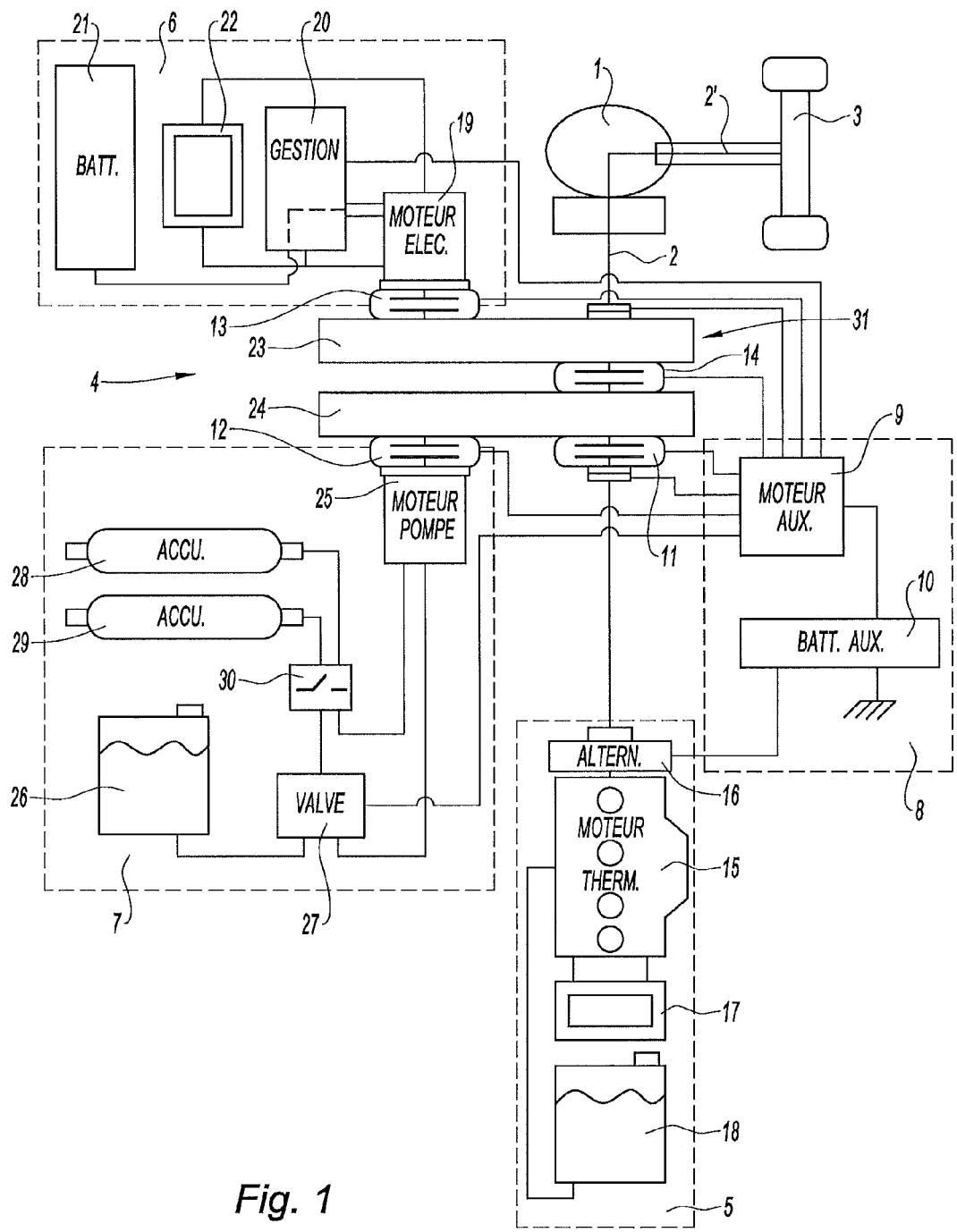

(52) U.S. Cl.
CPC .......... *Y02T10/6208* (2013.01); *Y02T 10/6221* (2013.01); *Y02T 10/6282* (2013.01); *Y10S 903/96* (2013.01)

(56) References Cited

U.S. PATENT DOCUMENTS

| | | | |
|---|---|---|---|
| 5,492,189 A * | 2/1996 | Kriegler et al. | 180/65.23 |
| 5,495,912 A * | 3/1996 | Gray et al. | 180/165 |
| 5,571,058 A * | 11/1996 | Schmidt | 475/5 |
| 6,170,587 B1 * | 1/2001 | Bullock | 180/69.6 |
| 6,705,030 B2 * | 3/2004 | Tokunaga | 37/348 |
| 7,086,226 B2 * | 8/2006 | Oguri | 60/414 |
| 7,273,122 B2 * | 9/2007 | Rose | 180/165 |
| 7,689,341 B2 * | 3/2010 | Miller | 701/70 |
| 7,841,432 B2 * | 11/2010 | Lynn et al. | 180/65.21 |
| 8,165,738 B2 * | 4/2012 | Akaki et al. | 701/22 |
| 8,347,998 B2 * | 1/2013 | Ericson et al. | 180/165 |
| 8,360,183 B2 * | 1/2013 | Sauvlet et al. | 180/65.28 |
| 8,474,556 B2 * | 7/2013 | Wang et al. | 180/65.22 |
| 8,494,730 B2 * | 7/2013 | Yoshikawa | 701/51 |
| 8,649,926 B2 * | 2/2014 | Baino et al. | 701/22 |
| 8,771,138 B2 * | 7/2014 | Van Batavia et al. | 477/6 |
| 8,776,921 B2 * | 7/2014 | Richter | 180/65.285 |
| 2002/0148144 A1 * | 10/2002 | Tokunaga | 37/348 |
| 2005/0036894 A1 * | 2/2005 | Oguri | 417/212 |
| 2005/0064987 A1 * | 3/2005 | Budal et al. | 477/3 |
| 2008/0000746 A1 * | 1/2008 | Schiele et al. | 192/3.54 |
| 2009/0139788 A1 * | 6/2009 | Miller | 180/165 |
| 2010/0133031 A1 * | 6/2010 | Mendler | 180/165 |
| 2012/0014815 A1 | 1/2012 | Kraxner | |
| 2013/0042602 A1 * | 2/2013 | Gauthier | 60/327 |
| 2013/0068056 A1 * | 3/2013 | Van Batavia et al. | 74/335 |
| 2013/0178329 A1 * | 7/2013 | Gauthier | 477/3 |
| 2013/0253748 A1 * | 9/2013 | Kiuchi | 701/22 |
| 2014/0014431 A1 * | 1/2014 | Rodi et al. | 180/165 |

* cited by examiner

MOTOR VEHICLE HAVING THREE MOTORS, I.E. AN ELECTRIC MOTOR, A HYDRAULIC MOTOR AND A HEAT ENGINE, AND METHOD FOR MANAGING THE ENERGY STORED ONBOARD

CROSS-REFERENCE TO RELATED APPLICATIONS

This application is a §371 national stage entry of International Application No. PCT/EP2012/052817, filed Feb. 17, 2012, which claims priority to French Patent Application No. 1100528, filed Feb. 22, 2011, the entire contents of which are incorporated herein by reference.

The field of the invention is that of land motor vehicles, for transporting both goods and people, and both passenger cars and public transport vehicles.

A wheel-mounted motor vehicle therefore comprises wheel sets that are driven in rotation, via a transmission shaft and axles, by a motor assembly. There are various possible energy sources for operating the motor assembly. The most common one is fossil energy, constituted by petrol or diesel fuel, for internal combustion engines. For electric motors, electrical energy stored in batteries or "supercapacitors" can also be used. Finally, for hydraulic motors, a pressurised fluid (generally oil) can be utilised, which is contained in a bottle for storing this hydraulic energy. Batteries and supercapacitors are rechargeable devices. Similarly, the bottles of fluid can also be refilled, by a hydraulic motor operating as a pump or by a separate pump.

It should be pointed out clearly here that a heat engine can also be used for driving the wheels and for recharging or refilling the energy storage containers, i.e. batteries, supercapacitors or bottles of fluid. In the first case, it is said to be connected in parallel and in the second case, in series.

Lead or nickel-cadmium batteries are often considered as batteries for storing electrical energy. However, these are very heavy and bulky. What is more, since it is difficult to find out how much energy is stored, there is a frequent tendency to overestimate the storage, which is detrimental to the energy efficiency of the vehicles. All this leads to excessive operating costs for electric motor vehicles.

Supercapacitors are much lighter and smaller, but they become discharged very quickly and are very expensive. Without a heat engine (generator set) in series, it is difficult to envisage how they could be exploited.

In any case, recharging an electrical energy storage container is not straightforward, whereas it is easy to refill a bottle of fluid.

Hybrid drives have already been proposed.

With a heat engine assisted by an electric motor, if the electric motor is powerful enough, it is possible to start the vehicle and drive it at slow speeds with the electric motor. This type of hybrid drive is also of interest during braking phases, during which the electric motor can be used as a generator.

Some manufacturers have already fitted vehicles with an assembly comprising a heat engine and a hydraulic pump/motor. The hydraulic motor has high performance on starting, not to mention its efficient energy recovery, as explained above.

Finally, it has also been possible to envisage thermal/hydraulic hybridisation, but in an extremely discreet manner.

The limitations of thermal/electrical hybridisation are obvious. Now, in order to overcome these limitations and solve the problem of recharging electricity storage containers, the applicants had the idea of combining thermal/electrical hybridisation and thermal/hydraulic hybridisation into a more advanced hybridisation, which could be termed trihybridisation.

Therefore, the present application relates first to a land motor vehicle comprising an electric motor for driving the vehicle and associated means for storing electrical energy, a hydraulic motor for driving the vehicle and associated means for storing hydraulic energy, and a heat engine, with means for storing fossil energy, which is arranged so as to be connected in series and so as to recharge the means for storing hydraulic energy but not the means for storing electrical energy associated with the electric drive motor.

The invention is remarkable in more than one way. First of all, the vehicle comprises a motor assembly operating with three different energy sources (fossil, electrical and thermal). Next, taking account of the similarity between electrical storage and hydraulic storage, there was no reason to want to hybridise the two. Because of this—and this is a token of inventive step—it is possible to avoid having recharge the means for storing electrical energy during travel, and to reserve recharging for when stopped, at the dedicated unit or at the garage, thus solving the problem of difficulty in recharging on board the vehicle.

Preferably, the heat engine is arranged so as to be also connected in parallel as a drive motor for the vehicle.

In this case, the vehicle can advantageously be operated as follows.

The vehicle starts up with the hydraulic motor, which is perfectly suited to requirements and has better performance than any other low-speed drive.

As soon as the vehicle moves off, the electric motor becomes active: it operates alongside and then replaces the hydraulic traction in line with the increase in speed.

Operation remains satisfactory and overall, the electric motor is totally efficient, with very low heat dissipation.

At full capacity, the heat engine can in turn operate alongside the electric motor or even replace it completely.

Advantageously, the hydraulic motor is a pump motor—it could also be combined with a pump—and the electric motor is a motor-generator.

The invention also relates to a method for managing the energy stored on board a land motor vehicle comprising an electric motor for driving the vehicle and associated means for storing electrical energy, a hydraulic motor for driving the vehicle and associated means for storing hydraulic energy, and a heat engine, with means for storing fossil energy, according to which method, when the vehicle is travelling, the means for storing electrical energy of the electric motor are not recharged by the heat engine, which can recharge the means for storing hydraulic energy of the hydraulic drive motor.

Advantageously, the heat engine can recharge the means for storing electrical energy of an auxiliary electric motor for the operation of the vehicle.

Advantageously too, when the vehicle is slowed down, the hydraulic motor is operated, in the case of a pump motor, as a pump that recharges the means for storing hydraulic energy while braking the vehicle. If the hydraulic motor is combined with a pump, the pump is operated, which recharges the means for storing hydraulic energy while braking the vehicle.

Figure 2:
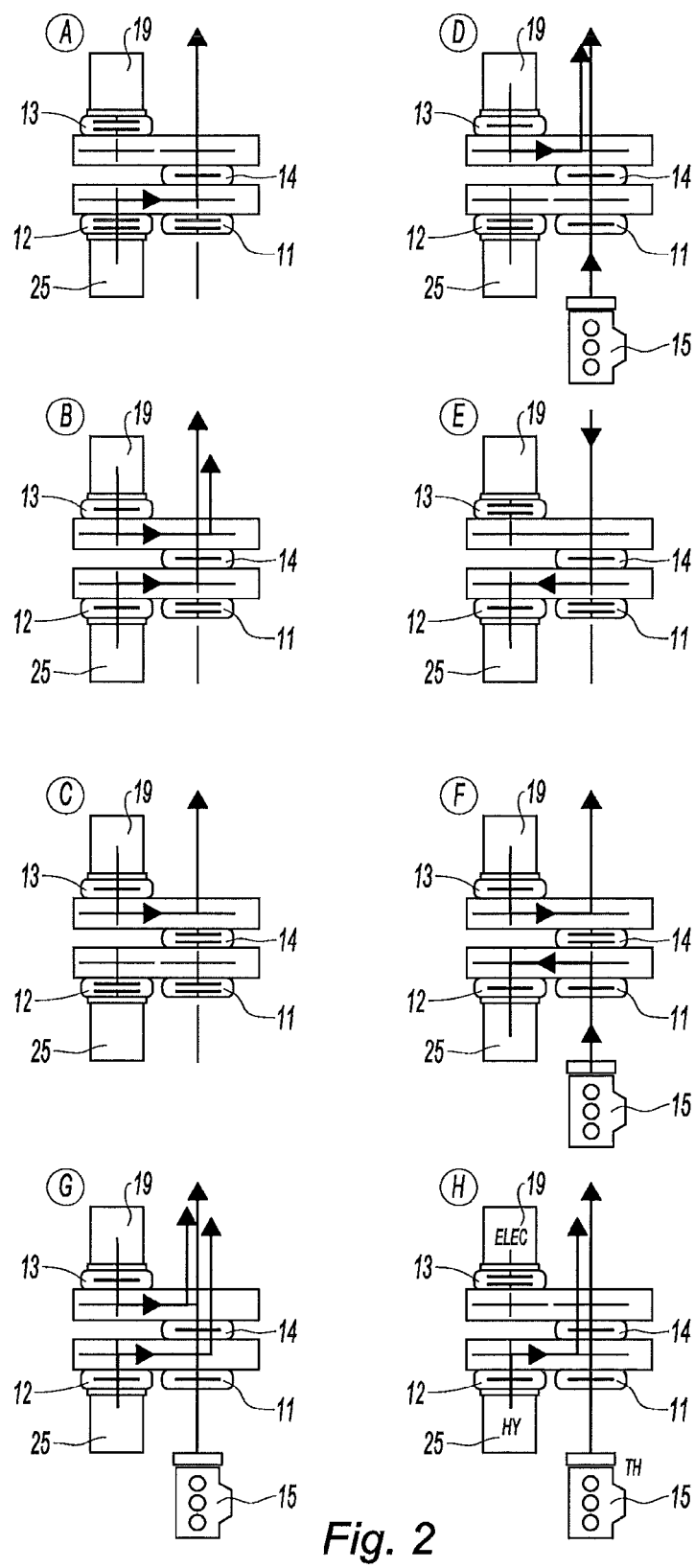
Figure 3:
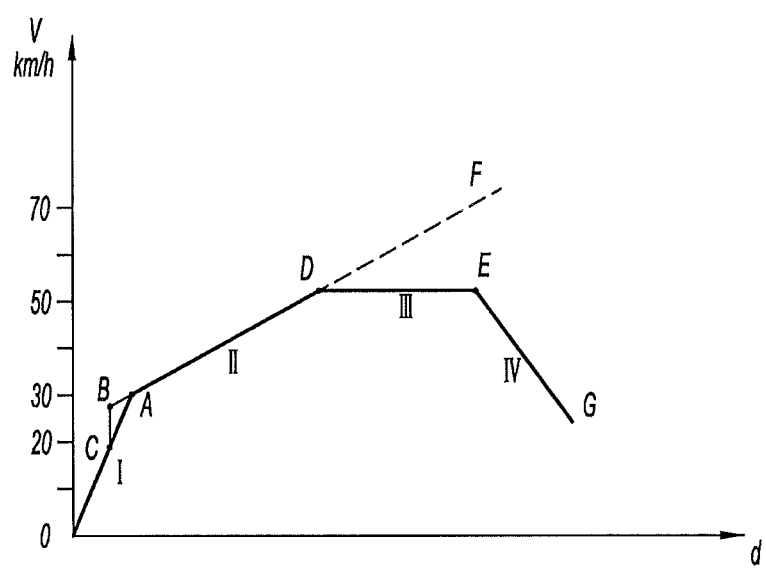

It will be easier to understand the invention by means of the following description of the trihybrid vehicle and the method for managing the energy of the vehicle of the invention, with reference to the attached drawings, in which FIG. 1 is a functional diagram of the vehicle;

FIGS. 2A-2H are diagrams illustrating eight operating modes of the vehicle and FIG. 3 is a diagram of the course of one possible conventional operating mode of the vehicle.

With reference to FIG. 1 this shows, from the vehicle of the invention, one of its axles 1 intended, via a transmission shaft 2', to drive a wheel set 3 in rotation. The axle 1 is itself controlled by the transmission shaft 2 and a motor assembly 4 comprising a thermal sub-assembly 5, an electrical sub-assembly 6, and a hydraulic sub-assembly 7.

The motor also comprises an auxiliary electrical sub-assembly 8 for the operation of the various units of the vehicle, comprising an auxiliary motor 9 and an auxiliary battery 10, here 24 V.

The vehicle can be provided with traction by the thermal sub-assembly 5 via a clutch 11, by the hydraulic sub-assembly 7, via a clutch 12, and by the electrical sub-assembly 6, via a clutch 13. The clutches 11, 12 and 13 are powered by the auxiliary motor 9. The axle 1 is connected to the clutches 11, 12 by an intermediate clutch 14 which is also powered by the auxiliary motor 9. The shaft 2 is connected to the clutches 13, 14 by a gearbox 23 and to the clutches 11, 12 by the gearbox 23, the clutch 14 and a second gearbox 24.

The Heat Engine Sub-Assembly 5

Conventionally, this comprises a heat traction engine 15 with, at the output of the engine, an alternator 16 for recharging the auxiliary battery 10, an engine cooling system 17 and a fossil fuel tank 18.

The Electric Motor Sub-Assembly 6

Conventionally, this comprises an electric motor 19, a management block 20, a battery for storing electrical energy 21, controlled by the management block 20, and a cooling system 22 for the motor, powered by the auxiliary motor 9.

The Hydraulic Motor Sub-Assembly 7

This comprises a hydraulic motor 25, which in this case is a pump motor, an oil reservoir 26 and, between the two, a main valve 27. Provision is made here for two bottles 28, 29 for storing hydraulic energy, in this instance hydraulic accumulators with, between them and the valve 27, a switch 30.

The assembly of gearboxes 23, 24 and clutches 11-14 constitutes an axial piston unit 31.

Now that the motor assembly of the vehicle has been described in relation to its main units, its operation shall be addressed.

With reference to FIG. 2A, the vehicle starts with the hydraulic motor 25, which has the best performance at low speeds. The clutches 12 and 14 are engaged and the clutches 11 and 13 are idle. At the end of this starting phase, the speed of the vehicle can reach 20 to 25 km/h.

With reference to FIG. 2B, once the vehicle has moved off, the electric motor 19 comes into operation and operates alongside the traction of the hydraulic motor 25. All the clutches (12, 13, 14) are engaged, except for the clutch 11 of the heat engine. The vehicle can continue running at a speed of 20 to 25 km/h.

With reference to FIG. 2C, once the speed has risen considerably, the electric motor 19 replaces the hydraulic motor 25. All the clutches (11, 12, 14) are idle, except for the clutch 13 of the hydraulic motor. The vehicle can run at a speed of 50 to 55 km/h.

With reference to FIG. 2D, the engine 4 is running at full capacity and the heat engine 15 is operating alongside the electric motor 19. All the clutches (11, 13, 14) are engaged, except for the clutch 12 of the hydraulic motor 25. The vehicle can run at a speed of 70 km/h.

With reference to FIG. 2E, in the case of slowing down, the hydraulic motor 25 operates as a pump in order to recharge the accumulators 28, 29 while braking the vehicle. The clutches 12 and 14 are engaged and the two others 11 and 13 are idle.

With reference to FIG. 2F, traction for the vehicle is provided by the electric motor 19, with the clutch 13 engaged. The heat engine 15 is used for recharging the accumulators 28, 29; in this case, it is said that the heat engine is connected in series. All the clutches (11, 12, 13) are engaged, except for the intermediate clutch 14.

It will be noted that the heat engine 15 connected in series can only recharge the hydraulic accumulators 28, 29 and not the electric battery 21 of the electric traction motor 19.

With reference to FIG. 2G, traction for the vehicle is trihybrid and is provided by the three motors: the hydraulic motor 25, the electric motor 19 and the heat engine 15. All the clutches 11-14 are engaged.

Finally, with reference to FIG. 2H, traction for the vehicle is provided by the hydraulic motor 25 and the heat engine 15. All the clutches (11, 12, 14) are engaged, except for the clutch 13 of the electric motor 19.

FIG. 3 shows the diagram of the speed of the vehicle, in km/h, as a function of the distance d covered, in relatively conventional operation.

Phase I (OA) is a hydraulic starting phase, with the motor 25. At the end of this phase (CA), before it is completed, the electric motor 19 is started (BA) while the vehicle is running at around 20 km/h. When the speed has reached 30 km/h (A), traction continues with just the electric motor 19 (AD), until the speed reaches around 50 km/h (D). If it is required to continue increasing the speed, electrical traction can be substituted by the traction of the heat engine 15 alone (DF). In this case, there is a saving in the battery 21 of the electric motor 19. Otherwise, in the case of a phase III at constant speed (DE), traction is provided both by the electric motor 19 and by the heat engine 15.

If the speed of the step DE is sufficient, when slowing down while the vehicle is running in phase IV (EG), the recharging of the accumulators 28, 29 is satisfactory. But if this step speed is too low, recovery of the charge in the accumulators while slowing down is no longer ensured and, in this case, these accumulators are recharged by the heat engine 15.

The invention claimed is:

1. A land motor vehicle comprising an electric motor (19) for driving the vehicle and associated means (21) for storing electrical energy, a hydraulic motor (25) for driving the vehicle and associated means (28, 29) for storing hydraulic energy, and a heat engine (15), with means (18) for storing fossil energy, wherein the heat engine is arranged so as to be connected in series and so as to recharge the means (28, 29) for storing hydraulic energy but not the means (21) for storing electrical energy associated with the electric drive motor.

2. The vehicle according to claim 1, in which the heat engine (15) is arranged so as to be also connected in parallel with at least one of the hydraulic motor (25) and the electric motor (19), so as to be used as a drive motor for the vehicle.

3. The vehicle according to claim 1, in which the electric motor (19), hydraulic motor (25) and heat engine (15) are connected to a transmission shaft (2) by three clutches (13, 12, 11) respectively.

4. A land motor vehicle comprising an electric motor (19) for driving the vehicle and associated means (21) for storing electrical energy, a hydraulic motor (25) for driving the vehicle and associated means (28, 29) for storing hydraulic energy, and a heat engine (15), with means (18) for storing fossil energy, wherein the heat engine is arranged so as to be connected in series so as to recharge the means (28, 29) for storing hydraulic energy but not the means (21) for storing electrical energy associated with the electric drive motor, wherein the electric motor (19), the hydraulic motor (25), and the heat engine (15) are connected to a transmission shaft (2) by three clutches (13, 12, 11) respectively, and wherein the three clutches (11-13), together with a fourth, intermediate clutch (14) and two gearboxes (23, 24), form an axial piston unit (31).

5. The vehicle according to claim 1, in which the hydraulic motor (25) is a pump motor.

6. The vehicle according to claim 1, in which the electric motor (19) is a motor-generator.

7. A method for managing the energy stored on board a land motor vehicle comprising an electric motor (19) for driving the vehicle and associated means (21) for storing electrical energy, a hydraulic motor (25) for driving the vehicle and associated means (28, 29) for storing hydraulic energy, and a heat engine (15), with means (18) for storing fossil energy, according to which method, when the vehicle is travelling, the means (21) for storing electrical energy of the electric motor (19) are not recharged by the heat engine (15), and the heat engine (15) can recharge the means (28, 29) for storing hydraulic energy of the hydraulic drive motor (25).

8. The method according to claim 7, according to which, since the hydraulic motor (25) is a pump motor, when the vehicle is slowed down, the hydraulic motor (25) is operated as a pump that recharges the means (28, 29) for storing hydraulic energy while braking the vehicle (8).

9. The method according to claim 7, according to which, the hydraulic motor being combined with a pump, the pump is operated, which recharges the means for storing hydraulic energy (28, 29) while braking the vehicle.

\* \* \* \* \*